(12) United States Patent
Grant et al.

(10) Patent No.: US 6,555,205 B2
(45) Date of Patent: *Apr. 29, 2003

(54) PRINTING PLATE AND METHOD TO PREPARE A PRINTING PLATE

(75) Inventors: Alexander Grant, Bloomfield, NJ (US); Patrice M. Aurenty, Wood-Ridge, NJ (US); Edward Stone, Morris Plains, NJ (US); Mark J. Lindsey, Hasbrouck Heights, NJ (US)

(73) Assignee: Kodak Polychrome Graphics LLC, Norwalk, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,225

(22) Filed: Jan. 27, 2000

(65) Prior Publication Data

US 2002/0164494 A1 Nov. 7, 2002

Related U.S. Application Data

(63) Continuation-in-part of application No. 09/244,580, filed on Feb. 4, 1999, now Pat. No. 6,455,132.

(51) Int. Cl.$^7$ .............. B32B 3/00; C09D 11/00; B41J 2/01

(52) U.S. Cl. ............ 428/195; 428/209; 428/211; 428/461; 428/500; 101/457; 101/461; 101/463.1; 101/465; 101/466; 523/160; 524/555; 106/31.13; 347/100; 347/105

(58) Field of Search ............... 428/500, 461, 428/195, 209, 211; 101/466, 465, 457, 463.1; 523/160; 524/555; 106/31.13; 347/100, 105

(56) References Cited

U.S. PATENT DOCUMENTS

| | | | |
|---|---|---|---|
| 3,877,372 A | 4/1975 | Leeds .................. 101/465 |
| 4,278,467 A | 7/1981 | Fadner .................. 106/2 |
| 4,365,043 A | 12/1982 | Konishi et al. .......... 525/113 |
| 4,544,624 A | 10/1985 | Nanpei et al. .......... 430/281 |
| 4,597,794 A | * 7/1986 | Ohta et al. ............ 106/20 |
| 4,694,302 A | * 9/1987 | Hackelman et al. ...... 106/20 |
| 4,718,340 A | 1/1988 | Love, III ............. 101/116 |
| 4,781,985 A | 11/1988 | Desjarlais ............ 428/421 |
| 4,833,486 A | 5/1989 | Zerillo ............... 346/1.1 |
| 4,854,969 A | 8/1989 | Bassemir et al. ....... 106/2 |
| 4,954,395 A | 9/1990 | Hasegawa et al. ....... 428/318.4 |
| 5,092,926 A | * 3/1992 | Owatari .............. 106/22 |
| 5,096,781 A | 3/1992 | Viera et al. ........... 428/411.1 |
| 5,134,187 A | * 7/1992 | Aihara ................ 524/548 |
| 5,141,556 A | 8/1992 | Matrick .............. 106/20 |
| 5,266,443 A | 11/1993 | Higashi et al. ........ 430/272 |
| 5,272,201 A | * 12/1993 | Ma et al. ............ 524/505 |
| 5,312,654 A | * 5/1994 | Arimatsu et al. ...... 427/511 |
| 5,316,575 A | 5/1994 | Lent et al. .......... 106/20 R |
| 5,364,702 A | 11/1994 | Idei et al. ........... 428/423.1 |
| 5,368,974 A | 11/1994 | Walls et al. .......... 430/156 |
| 5,478,631 A | 12/1995 | Kawano et al. ........ 428/212 |
| 5,551,585 A | 9/1996 | Huang et al. ......... 216/11 |
| 5,656,701 A | 8/1997 | Miyamoto et al. ...... 525/453 |
| 5,695,908 A | * 12/1997 | Furukawa ............ 101/466 |
| 5,716,436 A | 2/1998 | Sorriero et al. ....... 106/31.87 |
| 5,738,013 A | 4/1998 | Kellett .............. 101/463.1 |
| 5,773,194 A | 6/1998 | Hattori et al. ........ 430/284.1 |
| 5,820,932 A | 10/1998 | Hallman et al. ....... 427/261 |
| 5,821,283 A | 10/1998 | Hesler et al. ........ 523/161 |
| 5,861,230 A | 1/1999 | Lambert et al. ....... 430/202 |
| 5,900,345 A | 5/1999 | Platzer et al. ....... 430/156 |
| 5,942,335 A | 8/1999 | Chen et al. .......... 428/500 |
| 6,040,358 A | * 3/2000 | Page et al. .......... 523/161 |
| 6,090,193 A | * 7/2000 | Nigam et al. ........ 106/31.27 |
| 6,099,632 A | * 8/2000 | Nagasawa et al. ..... 106/31.9 |
| 6,131,514 A | * 10/2000 | Simons .............. 101/466 |
| 6,245,121 B1 | 6/2001 | Aurenty et al. ...... 428/304.4 |

FOREIGN PATENT DOCUMENTS

| | | |
|---|---|---|
| CA | 2107980 | 4/1994 |
| DE | 4330428 | 3/1994 |
| EP | 071345 | 2/1983 |
| EP | 101266 | 2/1984 |
| EP | 0503621 | 9/1992 |
| EP | 591916 | 4/1994 |
| EP | 0738608 | 10/1996 |
| EP | 751194 | 1/1997 |
| EP | 829574 | 3/1998 |
| EP | 847868 | 6/1998 |
| EP | 882584 | 12/1998 |
| GB | 2332646 | 6/1999 |
| JP | 62059046 | 9/1988 |
| JP | 63224988 | 9/1988 |
| JP | 9029926 | 2/1997 |
| JP | 9255765 | 9/1997 |
| JP | 08329147 | 6/1998 |
| JP | 10151852 | 6/1998 |
| WO | WO 0046036 | 8/2000 |

* cited by examiner

*Primary Examiner*—Paul Thibodeau
*Assistant Examiner*—Monique R. Jackson
(74) *Attorney, Agent, or Firm*—Faegre & Benson LLP

(57) ABSTRACT

A printing plate is prepared by the process comprising: (a) providing a substrate; and (b) applying by ink jetting to the substrate a fluid composition comprising a cationic polymer and an anionic polymer, in non-aqueous solvent. The ionic polymers interact and adhere to the substrate, so that after drying a durable printing plate is formed, without chemical development. The printing plate of this invention is capable of extended press run length and advantageously avoids the need of chemical development.

30 Claims, No Drawings

PRINTING PLATE AND METHOD TO PREPARE A PRINTING PLATE

CROSS-REFERENCE TO RELATED APPLICATION

This is a continuation-in-part of U.S. patent application Ser. No. 09/244,580, filed Feb. 4, 1999, now U.S. Pat. No. 6,455,132, which is hereby incorporated by reference in its entirety.

FIELD OF THE INVENTION

This invention relates to a printing plate, a method of making a printing plate, and a method of printing using a printing plate to form a desired image on a medium. More particularly, the printing plate of this invention employs a substrate and a fluid composition comprising a cationic polymer and an anionic polymer, in which the ionic polymers interact and adhere to the substrate. The fluid composition is applied by ink jetting to the substrate, providing a printing plate that is ready-to-use on a press without having to develop it.

BACKGROUND OF THE INVENTION

The offset lithographic printing process has long used a developed planographic printing plate having oleophilic image areas and hydrophilic non-image areas. The plate is commonly dampened before or during inking with an oil-based ink composition. The dampening process utilizes a fountain solution such as those described in U.S. Pat. Nos. 3,877,372, 4,278,467 and 4,854,969. When water is applied to the plate, the water will form a film on the non-image hydrophilic areas, but will contract into tiny droplets on the oleophilic image areas. When a roller carrying an oil-based ink composition is passed over the dampened plate, it will not ink the non-image areas that are covered by the aqueous film, but will emulsify the water droplets on the water repellant image areas, which will then take up ink. The resulting ink image is transferred, or "offset," onto a rubber blanket, which is then used to print onto a medium such as paper.

It has been proposed to apply "direct" ink jet printing techniques to lithographic printing. For example, European Patent Publication No. 503,621 discloses a direct method to make lithographic plates by jetting a photocurable ink onto the plate substrate, and then exposing the plate to ultraviolet radiation to harden the image area. An oil-based ink may then be transferred to the image area for printing onto a printing medium. But, neither the resolution of ink drops jetted onto the substrate, nor the durability of the lithographic printing plate with respect to printing runlength was disclosed.

It has also been proposed to apply the direct ink jet printing techniques without the additional steps of chemical development of the plate. This approach advantageously results in lower production costs and a more environmentally acceptable printing process. However, in such techniques it is difficult to control the spreading of the droplets of ink-jetted fluid that forms the oleophilic ink-accepting regions on the printing plate substrate. Such droplet "dot spreading" causes lower resolution of printed images and reduced image quality. For example, European Patent Application No. 591,916 A2 discloses a water-based ink having a polymer containing anhydride groups which are thermally cross-linked on the substrate with a hydroxy-functional polymer. This formulation is applied by jetting the formulation, which is at room temperature, onto a room temperature substrate. However, this formulation does not achieve good control of dot spreading.

U.S. Pat. No. 4,833,486 discloses the apparatus and process for imaging a plate with a "hot melt" type of ink jet printer. The image is produced by jetting at high temperature a "phase change" type of ink which solidifies when it hits the cooler substrate. The ink becomes instantaneously solid rather than remaining a liquid or gel which is thereafter cured to form a solid. However, such an ink does not provide good resistance to press run due to the wax-type nature of the ink formulation.

U.S. Pat. No. 5,942,335 discloses the use of a polymer containing a nitrogen-containing heterocyclic group, namely a polymer of 4-vinyl pyridine, in the formulation of an ink receiving layer of an ink jet recording sheet. However, the use of such a compound in a fluid composition applied directly to a printing plate substrate to form an imaged, ink-receptive layer is not disclosed.

Thus, it would be advantageous to employ a printing plate capable of extended press run length which does not require chemical development.

It is one object of this invention to provide such a printing plate. It is another object of this invention to provide a method of preparing such a printing plate. It is yet another object of this invention to provide a method of using such a printing plate. The printing plate of this invention may advantageously be prepared without a chemical development step typically required. The printing plate of this invention is also capable of extended press run length.

SUMMARY OF THE INVENTION

The fluid composition of this invention is suitable for ink jetting upon a substrate and comprises a cationic product polymer and an anionic product polymer, in non-aqueous solvent. The ionic product polymers interact and adhere to the substrate, so that after drying, a durable printing plate is formed without chemical development.

The printing plate of this invention is prepared by: (a) providing a substrate; and (b) applying by ink jetting to the substrate a fluid composition as described below. In a preferred embodiment, the substrate is pretreated with a surfactant to provide a printing plate precursor.

In preferred embodiments, the cationic product polymer is prepared from a basic polymeric compound which is selected from the group consisting of polymers and copolymers of 2-vinylpyridine, polymers and copolymers of 4-vinylpyridine, polymers and copolymers of dimethylaminoethyl methacrylate, and mixtures or derivatives thereof. The basic polymeric compounds prepared from these monomers are made cationic by at least partially neutralizing with an acid, preferably formic acid, to create cationic conjugate acid groups from the base groups of the basic polymeric compounds.

In preferred embodiments, the anionic product polymer is prepared from an acidic polymeric compound which is selected from the group consisting of poly(acrylic acid)s, poly(methacrylic acid)s, poly(maleic acid)s, poly(maleic anhydride)s, poly(fumaric acid)s, poly(styrene-co-acrylic acid)s, poly(styrene-co-maleic acid)s, poly(styrene-co-fumaric acid)s, and mixtures or derivatives thereof. These acidic polymeric compounds are made anionic by at least partially neutralizing with base, preferably ammonia, to create anionic conjugate base groups from the acid groups of the acidic polymeric compounds.

The printing plate of this invention is capable of extended press run length and advantageously avoids the need of chemical development.

DETAILED DESCRIPTION OF THE INVENTION

To achieve extended printing runs with lithographic plates the oleophilic material must adhere well to the substrate. Adhesion of the oleophilic material may be controlled in at least two ways. First, the oleophilic material should have a chemical interaction with the substrate that provides a type of chemical binding and promotes adhesion. For example, the chemical composition of the oleophilic material can be varied to promote its adhesion to the substrate. Also, the composition of the substrate can be varied to increase binding of the oleophilic material. Further, high cohesive strength of the oleophilic material helps to bind it to itself on the substrate, thus improving its adhesion. Cohesive strength of the oleophilic material is enhanced by providing a means for chemical interaction between the molecules of the oleophilic material, preferably by crosslinking.

The second way that adhesion of the oleophilic material may be controlled is by providing a substrate in which microscopic topology allows the oleophilic material to interlock mechanically with the substrate when dry or hardened. Mechanical interlocking can be affected by roughening the surface of the substrate. Thus, by controlling these variables, a printing plate can be made with increased adhesion of the oleophilic material, and correspondingly longer printing run operation.

In the invention described here, the oleophilic material is placed on the substrate by ink jetting a fluid composition comprising the oleophilic material. Optionally, by pretreating the substrate surface with a surfactant to lower its surface tension, the spreading of droplets of fluid composition is reduced. Thus, by these and other features inherent in the composition and method described here, excellent printing resolution can be obtained, as well as long-lasting adhesion of the dried oleophilic material to the substrate.

The printing plate of this invention encompasses lithographic printing plates, flexographic printing plates, and gravure printing plates.

Conventional printing plate substrates such as aluminum, polymeric film, and paper may be used as the printing plate substrate of this invention. The printing plate substrate may be subjected to treatments such as electrograining, anodization, and silication to enhance its surface characteristics. The surface characteristics that are modified by such treatments are roughness, topology, and the nature and quantity of surface chemical sites.

Substrates that can be employed are given in Table 1. Substrates chosen for use in this invention are preferably based on aluminum oxide, and may be subjected to various conventional surface treatments as are well known to those skilled in the art, and give a surface that has either acidic or basic character in the Bronsted acid-base view. These treatments also result in different surface roughness, topology, and surface chemical sites, as summarized in Table 1.

TABLE 1

Substrates for printing plates

| Substrate name | Surface Treatment | Interlayer Treatment | Surface Property |
| --- | --- | --- | --- |
| AA | Quartz Grained and Anodized | None | Acidic |
| EG-PVPA | Electrograined and Anodized | Polyvinyl phosphoric acid | Acidic |
| PF | Electrograined and Anodized | Sodium dihydrogen phosphate/Sodium fluoride | Acidic |
| G20 | Electrograined and Anodized | Vinylphosphonic acid/acrylamide copolymer | Acidic/ Amphoteric |
| EG-Sil | Electrograined and Anodized | Sodium Silicate | Basic |
| DS-Sil | Chemically Grained and Anodized | Sodium Silicate | Basic |
| PG-Sil | Pumice Grained and Anodized | Sodium Silicate | Basic |
| CHB-Sil | Chemically Grained, Anodized and Silicated | Sodium Silicate | Basic |

"AA" means "as anodized." The aluminum surface is first quartz grained and then anodized using DC current of about 8 A/cm$^2$ for 30 seconds in a $H_2SO_4$ solution (280 g/liter) at 30° C.

"EG" means "electrolytic graining." The aluminum surface is first degreased, etched and subjected to a desmut step (removal of reaction products of aluminum and the etchant). The plate is then electrolytically grained using an AC current 30–60 A/cm$^2$ in a hydrochloric acid solution (10 g/liter) for 30 seconds at 25° C., followed by a post-etching alkaline wash and a desmut step. The grained plate is then anodized using DC current of about 8 A/cm$^2$ for 30 seconds in a $H_2SO_4$ solution (280 g/liter) at 30° C.

"PVPA" is a polyvinylphosphonic acid. The plate is immersed in a PVPA solution and then washed with deionized water and dried at room temperature.

"DS" means "double sided smooth." The aluminum oxide plate is first degreased, etched or chemically grained, and subjected to a desmut step. The smooth plate is then anodized.

"Sil" means the anodized plate is immersed in a sodium silicate solution to coat it with an interlayer. The coated plate is then rinsed with deionized water and dried at room temperature.

"PG" means "pumice grained." The aluminum surface is first degreased, etched and subjected to a desmut step. The plate is then mechanically grained by subjecting it to a 30% pumice slurry at 30° C., followed by a post-etching step and a desmut step. The grained plate is then anodized using DC current of about 8 A/cm$^2$ for 30 seconds in an $H_2SO_4$ solution (280 g/liter) at 30° C. The anodized plate is then coated with an interlayer.

"G2O" is a printing plate substrate which is described in U.S. Pat. No. 5,368,974, the disclosure of which is incorporated herein by reference in its entirety.

"CHB" means chemical graining in a basic solution. After an aluminum substrate is subjected to a matte finishing process, a solution of 50 to 100 g/liter NaOH is used during graining at 50 to 70° C. for 1 minute. The grained plate is then anodized using DC current of about 8 A/cm² for 30 seconds in an $H_2SO_4$ solution (280 g/liter) at 30° C. The anodized plate is then coated with a silicated interlayer.

"PF" substrate has a phosphate fluoride interlayer. The process solution contains sodium dihydrogen phosphate and sodium fluoride. The anodized substrate is treated in the solution at 70° C. for a dwell time of 60 seconds, followed by a water rinse, and drying. The deposited dihydrogen phosphate is about 500 mg/m².

A "basic" surface will have a plurality of basic sites and acidic sites present, with the basic sites predominating to some degree. Similarly, an "acidic" surface will have a plurality of acidic sites and basic sites present, with the acidic sites predominating to some degree. It is known by one of ordinary skill in the art that the PG-Sil printing plate substrate appears to have a higher silicate site density than the DS-Sil printing plate substrate, and is more basic. It is also known that the G20 printing plate substrate exhibits less acidic character than AA printing plate substrates.

The oleophilic polymeric material of the fluid composition of the present invention that forms the ink-receiving layer is prepared from a mixture of cationic and anionic product polymers prepared from basic and acidic polymeric compounds, respectively. The cationic product polymer is prepared by partially or fully neutralizing the base groups of the basic polymeric compound with acid to give a product polymer that comprises the base groups and their cationic conjugate acid groups, or comprises solely the cationic conjugate acid groups. The anionic product polymer is prepared by partially or fully neutralizing the acid groups of the acidic polymeric compound with base to give a product polymer that comprises the acid groups and their anionic conjugate base groups, or comprises solely the anionic conjugate base groups.

A mixture of the cationic and anionic product polymers is used in the fluid composition to make long-lasting printing plates. The mixture enhances the adhesion of the polymeric material to the substrate. The cationic conjugate acid groups of one product polymer interact with the anionic conjugate base groups of the other product polymer of the mixture to enhance the binding of the polymers to the substrate. Without intending to be bound by any one particular theory, the ionic polymeric compounds undergo ionic crosslinking which increases the cohesive strength of the oleophilic layer on the substrate and increases the printing press run length. Thus, the chemical binding of the product polymers to each other provides strong adhesion of the ink-receiving layer, a more durable printing plate, and longer printing press runs. The conjugate acid and base groups of the product polymers can also react with the acid and basic sites of the substrate in ionic double exchange to bind the polymers to the substrate. These modes of chemical binding of the product polymers work in combination with the physico-chemical adsorption of the product polymers to the roughened substrate to provide strong adhesion of the ink-receiving layer.

Acids suitable for neutralizing the base groups of a basic polymeric compound conform to one of the formulae in the group consisting of $H(CH_2)_nCOOH$, and $HOCHRCOOH$, where R is —H, —$CH_3$, or —$CH_2CH_3$, and n is from zero to six. Acids used in preferred embodiments are formic, acetic, lactic, and glycolic, while formic acid is especially preferred.

Bases suitable for neutralizing the acid groups of an acidic polymeric compound are selected from the group consisting of amines, ethanolamines, and the like. Bases used in preferred embodiments are ammonia and dimethylethanolamine, while ammonia is especially preferred.

Either the acidic or basic polymeric compounds can be a homopolymer, copolymer, terpolymer, and the like. The basic compound may also be a monomeric compound. By "copolymer" we mean any polymer comprised of more than one type of monomer, prepared in a copolymerization. By "terpolymer" we mean a polymer consisting essentially of three types of monomers, prepared in a copolymerization. Thus, a copolymer can include a terpolymer.

In preferred embodiments, the basic polymeric compound is preferably selected from the group consisting of polymers and copolymers of 2-vinylpyridines, polymers and copolymers of 4-vinylpyridines, polymers and copolymers of diaminoethyl methacrylates, and mixtures thereof. These polymeric compounds comprise an amine moiety that can react with formic acid to produce conjugate acid groups attached to a polymer chain, to react with the substrate.

In preferred embodiments, the basic polymeric compound is a copolymer comprising a monomer having the following formula:

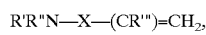

wherein

R' is hydrogen or $C_{1-5}$ branched or unbranched alkyl;

R" is $C_{1-5}$ branched or unbranched alkyl;

R'" is hydrogen or methyl;

wherein n is 2 to 6; and

Q is oxygen or NH.

In preferred embodiments, the acidic polymeric compound is prepared from at least one monomer selected from the group consisting of acrylic acids, methacrylic acids, maleic acids, fumaric acids, and mixtures thereof. Acidic polymeric compounds prepared from these monomers include poly(acrylic acid)s, poly(methacrylic acid)s, poly(maleic acid)s, poly(fumaric acid)s, poly(styrene-co-acrylic acid)s, poly(styrene-co-maleic acid)s, poly(styrene-co-fumaric acid)s, and mixtures thereof. Further, but not limiting examples include polymers of ethylenically unsaturated sulfonic acids, polymers of sulfonated styrene, and copolymers thereof. These acidic polymeric compounds are made anionic by at least partially neutralizing with base, preferably ammonia, to create anionic groups from the acid groups of the polymeric compounds.

In a preferred embodiment, the acidic polymeric compound is polyacrylic acid and the basic polymeric compound is poly-4-vinylpyridine-co-butylmethacrylate. In an especially preferred embodiment, the acidic polymeric compound is polyacrylic acid, the basic polymeric compound is poly-2-vinylpyridine, the substrate is AA, and the precursor surfactant is FC-129.

The ink-receptive layer produced with the mixture of cationic and anionic product polymers has excellent adhesion to the substrate surface, and as set forth in further detail below, the resulting printing plate exhibits extended press run length. Advantageously, chemical development of the printing plate is not required.

The fluid composition comprising the oleophilic polymeric mixture is preferably applied by ink jetting to the substrate surface, typically by an ink jet printer using equipment and techniques which are well known to those skilled in the art. In this manner, the substrate is imaged so that after the fluid composition dries, an ink receptive layer is formed in the desired image on the surface of the substrate.

that can be used for the precursor include alkyl tail surfactants, fluorosurfactants and siliconated surfactants.

Illustrative examples of alkyl tail surfactants include sodium dodecylsulfate, isopropylamine salts of an alkylarylsulfonate, sodium dioctyl succinate, sodium methyl cocoyl taurate, dodecylbenzene sulfonate, alkyl ether phosphoric acid, N-dodecylamine, dicocoamine, 1-aminoethyl-2-alkylimidazoline, 1-hydroxyethyl-2-alkylimidazoline, and cocoalkyl trimethyl quaternary ammonium chloride, polyethylene tridecyl ether phosphate, and the like.

Illustrative examples of fluorosurfactants useful in preferred embodiments of the present invention and their commercial trade names are set forth in Table 2.

TABLE 2

Fluorosurfactants useful in preferred embodiments

| Trade Name | Chemical Structure | Type |
|---|---|---|
| Zonyl FSD | $F(CF_2CF_2)_{1-7}$-alkyl-$N^+R_3Cl^-$ | Cationic |
| Fluorad FC-135 | $C_8F_{17}SO_2NHC_3H_6N^+(CH_3)_3I^-$ | Cationic |
| Zonyl FSA | $F(CF_2CF_2)_{1-7}CH_2CH_2SCH_2CH_2CO_2$—$Li^+$ | Anionic |
| Fluorad FC-129 | $C_8F_{17}SO_2N(C_2H_5)CH_2CO_2^-K^+$ | Anionic |
| Zonyl FSP | $(F(CF_2CF_2)_{1-7}CH_2CH_2O)_{1,2}PO(O^-NH_4^+)_{1,2}$ | Anionic |
| Zonyl FSJ[1] | $(F(CF_2CF_2)_{1-7}CH_2CH_2O)_{1,2}PO(O^-NH_4^+)_{1,2}$ | Anionic |
| Fluorad FC-120 | $C_{10}F_{21}SO_3^-NH_4^+$ | Anionic |
| Zonyl FS-62 | $C_6F_{13}CH_2CH_2SO_3H$, $C_6F_{13}CH_2CH_2SO_3^-NH_4^+$ | Anionic |
| Zonyl FSK | $F(CF_2CF_2)_{1-7}CH_2CHOAcCH_2N^+R_2CH_2COO^-$ | Amphoteric |
| Fluorad FC-100[2] | $R^{**}SO_3^-$ | Amphoteric |
| Fluorad FC-170C | $C_8F_{17}SO_2N(C_2H_5)(CH_2CH_2O)_xH$ | Nonionic |
| Fluorad FC-171 | $C_8F_{17}SO_2N(C_2H_5)(CH_2CH_2O)_xCH_3$ | Nonionic |
| Zonyl FSO[3] | $F(CF_2CF_2)_{1-7}CH_2CH_2O(CH_2CH_2O)_yH$ | Nonionic |
| Zonyl FS-300[3] | $F(CF_2CF_2)_{1-7}CH_2CH_2O(CH_2CH_2O)_zH$ (z > y) | Nonionic |

[1]FSJ also contains a nonfluorinated surfactant.
[2]R** contains an ammonium function.
[3]y or z = 0 to about 25.

The fluid composition may comprise about 0.1 to 25 weight percent, preferably about 0.1 to 8 weight percent, and most preferably about 0.1 to 4 weight percent of the acidic polymeric compound, based upon the total weight of the fluid composition.

The fluid composition may comprise about 0.1 to 25 weight percent, preferably about 0.1 to 8 weight percent, and most preferably about 0.1 to 4 weight percent of the basic polymeric compound, based upon the total weight of the fluid composition.

Adsorbing a surfactant to a conventional printing plate substrate, prior to application of an ink receptive layer, can improve the image resolution achieved. Such a surfactant-pretreated substrate will be termed a "printing plate precursor" herein. A printing plate may be prepared from the printing plate precursor by image-wise applying a fluid composition as described above to the substrate. In a preferred embodiment, the fluid composition is applied by means of an ink jet printer, and then dried to form an ink receptive layer in the form of the desired image. Advantageously, chemical development of the printing plate is not required.

Adhesion of the polymer from the fluid composition to the substrate after drying is not diminished substantially by the presence of the precursor plate surfactant, which tends only to slow the spreading of the droplet deposited by the ink jet nozzle. Thus, the precursor plate surfactant can increase resolution without reducing press run length. Surfactants ZONYL surfactants are commercially available from E. I. du Pont de Nemours & Co. and have a distribution of perfluoroalkyl chain length. FLUORAD surfactants are commercially available from 3M Company and have a narrow distribution of the hydrophobic chain length.

Illustrative siliconated surfactants include the following non-exhaustive listing: polyether modified poly-dimethyl-siloxane, silicone glycol, polyether modified dimethyl-polysiloxane copolymer, and polyether-polyester modified hydroxy functional polydimethyl-siloxane.

The precursor plate surfactant may be adsorbed onto the substrate by any conventional method, preferably by immersion of the substrate in an aqueous solution of the surfactant for a time, typically one minute, which is effective to permit adsorption of the surfactant upon the substrate. In a particularly preferred embodiment, any non-absorbed surfactant is then removed from the printing plate substrate surface. Preferably, the substrate is rinsed with water to remove non-adsorbed surfactant, then dried. The resulting printing plate precursor has a surfactant on at least one surface, in an amount effective to improve the resolution of printing.

An imaged substrate prepared by imagewise applying a fluid composition to a substrate could also be used, for example, as a precursor for a printed circuit board in which conductive metals are deposited onto the imaged substrate.

The following examples are given to illustrate preferred embodiments of the present invention and are not intended to limit the invention in any way. It should be understood that the present invention is not limited to the above-mentioned embodiments. Numerous modifications can be made by one skilled in the art having the benefits of the teachings given here. Such modifications should be taken as

EXAMPLE 1

Comparative: A fluid composition was prepared by dissolving a copolymer of 2-(dimethylamino)ethyl methacrylate and methyl methacrylate, R2737-188, in diglyme (bis (2-methoxyethyl)ether), then adding formic acid in an amount effective to neutralize the base groups of the polymer. This fluid composition contained 1 weight percent copolymer R2737-188. This fluid composition was then ink-jetted with an EPSON 440 printer onto an EG-Sil substrate (Table 1) that was pretreated with FLUORAD FC-135 precursor plate surfactant. After drying without processing or developing, the image on the substrate did not rub off with a pad impregnated with ink and water. This printing plate was used in an accelerated press trial of 12,000 impressions on paper, at which point evidence of image wear was observed. Thus, the plate was suitable for very low volume printing. The accelerated press trial used a rubber transfer blanket of high hardness that accelerates wear of the printing plate. This fluid composition was not suitable for commercial printing, less than 200 impressions, on an acidic G20 substrate (Table 1) pretreated with FLUORAD FC-129 surfactant.

Copolymer R2737-188 was prepared by mixing 300 g methyl isobutyl ketone (MIBK), 0.75 g dodecylmercaptan, and 1.5 g VAZO 88 in a flask. The mixture was stirred, nitrogen-blanketed, and heated to reflux. A blend of 94 g dimethylamine ethyl methacrylate, 216 g methyl methacrylate (MMA), and 20 g MIBK was added dropwise over 2.5 hours at a constant rate. A solution of 1.5 g VAZO 88 in 20 g MIBK was added thirty minutes later. The mixture was heated and stirred for four hours, resulting in a clear, golden solution. About 166.2 g of MIBK was removed by distillation. Water (559 g) was added at about 80° C. and azeotropic distillation began, resulting in a pasty mass. At 90° C., 55 g water and 19 g formic acid were added, resulting in a much more fluid dispersion. Azeotropic distillation continued until 99° C., when very little MIBK was being removed. The product was an opaque dispersion of a 28% dimethylamine ethyl methacrylate and 72% methyl methacrylate copolymer, three-fourths neutralized with formic acid. The dispersion had a pH of 6.20, was 33.2% solids, and had a Brookfield viscosity of 16,900 centipoise at 5 rpm.

A printing plate that survives an accelerated press trial of fifteen thousand impressions with no evidence of wear of the ink-receiving layer on the substrate or in the printed impressions is suitable for a variety of commercial applications. Such a plate is called suitable for "low volume" printing since a press run of fifteen thousand is a low volume commercial run. It should be noted that passing an accelerated press trial of fifteen thousand impressions with no evidence of wear means that the plate is capable of a substantially longer press run than fifteen thousand under ordinary commercial printing conditions.

A printing plate that shows evidence of wear of the ink-receiving layer on the substrate or in the printed impressions for a run of about one thousand to less than about fifteen thousand impressions is a plate that is suitable for "very low volume" printing. A printing plate that shows evidence of wear of the ink-receiving layer on the substrate or in the printed impressions for a run of less than about one thousand impressions is a plate that is not suitable for commercial printing, although it has utility to form a lithographic image.

EXAMPLE 2

Comparative: A fluid composition was prepared by dissolving a copolymer of acrylic acid, R2866-31, in diglyme, then adding ammonia in an amount effective to neutralize the acid groups of the polymer. This fluid composition contained 1 weight percent of copolymer R2866-31. This fluid composition was then ink-jetted with an EPSON 440 printer onto G20 substrate (Table 1) that was pretreated with FLUORAD FC-135 precursor plate surfactant. After drying without processing or developing, the image on the substrate did not rub off with a pad impregnated with ink and water. This printing plate was used in an accelerated press trial of 3000 impressions on paper, at which point evidence of image wear was observed. Thus, this plate was suitable for very low volume printing. The accelerated press trial used a rubber transfer blanket of high hardness that accelerates wear of the printing plate. This fluid composition was not suitable for commercial printing on EG-Sil substrate.

Copolymer R2866-31 was prepared in a 2 liter round bottom flask connected to a condenser, with a stirrer, nitrogen feed and temperature probe. 1-methoxy-2-propanol/ Dowanol PM (360 g) was heated to 120° C. under a nitrogen blanket. Acrylic acid (120 g/50%), methyl methacrylate (11 g/5%), and butyl acrylate (109 g/45%) were then added with the initiator tertiary butyl peroctoate (3.6 g) over a period of two hours. More Initiator (1 g) was then added 10 minutes later as a residual monomer scrub. The reaction was held at 120° C. for a further two hours, after which the polymer solution was cooled and dumped. The final non-volatile content of the product was 40.5%.

EXAMPLE 3

Fluid composition R2884-105b was prepared by first dissolving a copolymer of acrylic acid, R2866-31, described in Example 2, in diglyme, then mixing this solution with a solution of copolymer R2737-188, described in Example 1, in diglyme, which formed a precipitate. To this mixture was added ammonia and formic acid in an amount effective to neutralize the base groups of copolymer R2737-188 and the acid groups of copolymer R2866-31, and redissolve the precipitate to give a clear solution. Fluid composition R2884-105b contained 0.5 weight percent copolymer R2866-31 and 0.5 weight percent copolymer R2737-188.

Fluid composition R2884-105b was then ink-jetted with an EPSON 440 printer onto EG-Sil substrate (Table 1) that was pretreated with FLUORAD FC-135 precursor plate surfactant. After drying without processing or developing, the image on the substrate did not rub off with a pad impregnated with ink and water. This printing plate was used in accelerated press trial of 15,000 impressions on paper, at which point no evidence of image wear was observed. Thus, this plate was suitable for low volume printing.

Fluid composition R2884-105b was also ink-jetted with an EPSON 440 printer onto G20 substrate (Table 1) that was pretreated with FLUORAD FC-135 precursor plate surfactant. After drying without processing or developing, the image on the substrate did not rub off with a pad impregnated with ink and water. This printing plate was used in accelerated press trial of 10,000 impressions on paper, at which point evidence of image wear was observed. Thus, this plate was suitable for very low volume printing.

EXAMPLE 4

Fluid composition R2884-105a was prepared by first dissolving a copolymer of acrylic acid, R2866-31, described in Example 2, in diglyme, then mixing this solution with a solution of a poly-2-vinylpyridine polymer (No. 813, Scientific Polymer Products, Inc.), in diglyme, which formed a precipitate. To this mixture was added ammonia and formic acid in an amount effective to neutralize the base groups of the poly-2-vinylpyridine polymer and the acid groups of copolymer R2866-31, and redissolve the precipitate to give a clear solution. Fluid composition R2884-105b contained 0.5 weight percent copolymer R2866-31 and 0.5 weight percent poly-2-vinylpyridine polymer.

Fluid composition R2884-105a was then ink-jetted with an EPSON 440 printer onto a G20 substrate (Table 1) that was pretreated with FLUORAD FC-135 precursor plate surfactant. After drying without processing or developing, the image on the substrate did not rub off with a pad impregnated with ink and water. This printing plate was used in accelerated press trial of 10,000 impressions on paper, at which point evidence of image wear was observed. Thus, this plate was suitable for very low volume printing.

Fluid composition R2884-105a was also ink-jetted with an EPSON 440 printer onto an AA substrate (Table 1) that was pretreated with FLUORAD FC-129 precursor plate surfactant. After drying without processing or developing, the image on the substrate did not rub off with a pad impregnated with ink and water. This printing plate was used in accelerated press trial of 15,000 impressions on paper, at which point no evidence of image wear was observed. Thus, this plate was suitable for low volume printing.

EXAMPLE 5

Fluid composition R2884-104c was prepared by first dissolving a copolymer of acrylic acid, R2866-31, described in Example 2, in diglyme, then mixing this solution with a solution of a poly-4-vinylpyridine-co-butyl methacrylate copolymer (50% BMA, No. 858, Scientific Polymer Products, Inc.), in diglyme, which formed a precipitate. To this mixture was added ammonia and formic acid in an amount effective to neutralize the base groups of the poly-4-vinylpyridine-co-butyl methacrylate copolymer and the acid groups of copolymer R2866-31, and redissolve the precipitate to give a clear solution. Fluid composition R2884-104c contained 0.33 weight percent copolymer R2866-31 and 0.67 weight percent poly-4-vinylpyridine-co-butyl methacrylate copolymer.

Fluid composition R2884-104c was then ink-jetted with an EPSON 440 printer onto an EG-Sil substrate (Table 1) that was pretreated with FLUORAD FC-135 precursor plate surfactant. After drying without processing or developing, the image on the substrate did not rub off with a pad impregnated with ink and water. This printing plate was used in accelerated press trial of 1,000 impressions on paper, at which point evidence of image wear was observed. Thus, this plate was suitable for very low volume printing.

Fluid composition R2884-104c was also ink-jetted with an EPSON 440 printer onto an AA substrate (Table 1) that was pretreated with FLUORAD FC-129 precursor plate surfactant. After drying without processing or developing, the image on the substrate did not rub off with a pad impregnated with ink and water. This printing plate was used in accelerated press trial of 15,000 impressions on paper, at which point no evidence of image wear was observed. Thus, this plate was suitable for low volume printing.

EXAMPLE 6

Comparative: Fluid composition VI was prepared by first dissolving a poly-2-vinylpyridine polymer (No. 813, Scientific Polymer Products, Inc.) in diglyme, then adding formic acid in an amount effective to neutralize the base groups of the poly-2-vinylpyridine polymer.

Fluid composition VI was then ink-jetted with an EPSON 440 printer onto a G20 substrate (Table 1) that was pretreated with FLUORAD FC-135 precursor plate surfactant. After drying without processing or developing, the image on the substrate did not rub off with a pad impregnated with ink and water. This printing plate was used in accelerated press trial of 100 impressions on paper, at which point evidence of image wear was observed. Thus, this plate was not suitable for commercial printing.

EXAMPLE 7

Comparative: Fluid composition VII was prepared by first dissolving a poly-4-vinylpyridine-co-butyl methacrylate copolymer (No. 858, Scientific Polymer Products, Inc.), in diglyme, then adding formic acid in an amount effective to neutralize the base groups of the poly-4-vinylpyridine-co-butyl methacrylate copolymer.

Fluid composition VII was then ink-jetted with an EPSON 440 printer onto an EG-Sil substrate (Table 1) that was pretreated with FLUORAD FC-135 precursor plate surfactant. After drying without processing or developing, the image on the substrate did not rub off with a pad impregnated with ink and water. This printing plate was used in accelerated press trial of 500 impressions on paper, at which point evidence of image wear was observed. Thus, this plate was not suitable for commercial printing.

The invention claimed is:

1. A fluid composition suitable for ink jetting upon a substrate, comprising:
   (a) a basic polymeric compound which is at least partially neutralized with acid to produce a cationic polymeric compound;
   (b) an acidic polymeric compound which is at least partially neutralized with base to produce an anionic polymeric compound; and
   (c) non-aqueous solvent which comprises in the range of about 84% to 99.8% by weight of the fluid composition.

2. The fluid composition of claim 1, in which said acidic polymeric compound is selected from the group consisting of poly(acrylic acid)s, poly(methacrylic acid)s, poly(maleic acid)s, poly(maleic anhydride)s, poly(fumaric acid)s, poly(styrene-co-acrylic acid)s, poly(styrene-co-maleic acid)s, poly(styrene-co-fumaric acid)s, and mixtures thereof.

3. The fluid composition of claim 1, in which said basic polymeric compound is selected from the group consisting of polymers of 2-vinylpyridine, copolymers of 2-vinylpyridine, polymers of 4-vinylpyridine, copolymers of 4-vinylpyridine, poly(amide)s, and poly(urethane)s.

4. The fluid composition of claim 1, in which said basic polymeric compound is a copolymer comprising a monomer having the following formula:

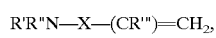

wherein
   R' is hydrogen or $C_{1-5}$ branched or unbranched alkyl;
   R" is $C_{1-5}$ branched or unbranched alkyl;
   R'" is hydrogen or methyl;

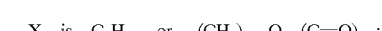

wherein n is 2 to 6; and

Q is oxygen or NH.

5. The fluid composition of claim 1, in which the non-aqueous solvent is diglyme.

6. The fluid composition of claim 1, in which said acidic polymeric compound is present in an amount from 0.1 to 25 weight percent based upon the total weight of the fluid composition.

7. The fluid composition of claim 6, in which said acidic polymeric compound is present in an amount from 0.1 to 8 weight percent based upon the total weight of the fluid composition.

8. The fluid composition of claim 7, in which said acidic polymeric compound is present in an amount from 0.1 to 4 weight percent based upon the total weight of the fluid composition.

9. The fluid composition of claim 1, in which said basic polymeric compound is present in an amount from 0.1 to 25 weight percent based upon the total weight of the fluid composition.

10. The fluid composition of claim 9, in which said basic polymeric compound is present in an amount from 0.1 to 8 weight percent based upon the total weight of the fluid composition.

11. The fluid composition of claim 10, in which said basic polymeric compound is present in an amount from 0.1 to 4 weight percent based upon the total weight of the fluid composition.

12. The fluid composition of claim 1, wherein the non-aqueous solvent comprises in the range of about 92% to 99.8% by weight of the fluid composition.

13. A fluid composition suitable for ink jetting upon a substrate prepared by the process comprising:

(a) providing a basic polymeric compound;

(b) neutralizing the basic polymeric compound at least partially with acid to produce a cationic polymeric compound;

(c) providing an acidic polymeric compound;

(d) neutralizing the acidic polymeric compound at least partially with base to produce an anionic polymeric compound; and (e) dissolving the at least partially neutralized basic polymeric compound and the at least partially neutralized acidic polymeric compound in non-aqueous solvent which comprises in the range of about 84% to 99.8% by weight of the fluid composition.

14. The fluid composition of claim 13, wherein the non-aqueous solvent comprises in the range of about 92% to 99.8% by weight of the fluid composition.

15. A printing plate prepared by the process comprising:

(a) providing a substrate; and (b) applying by ink jetting to the substrate a fluid composition comprising:

(i) a basic polymeric compound which is at least partially neutralized with acid to produce a cationic polymeric compound;

(ii) an acidic polymeric compound which is at least partially neutralized with base to produce an anionic polymeric compound; and (iii) non-aqueous solvent which comprises in the range of about 50% to 99.8% by weight of the fluid composition, wherein the substrate is pretreated to form a printing plate precursor with a surfactant selected from the group consisting of alkyl tail surfactants, fluorosurfactants and siliconated surfactant.

16. The printing plate of claim 15, in which the printing plate is dried subsequent to application of the fluid composition.

17. The printing plate of claim 15, wherein the non-aqueous solvent comprises in the range of about 84% to 99.8% by weight of the fluid composition.

18. A printing plate comprising:

(a) a substrate; and (b) a fluid composition applied by ink jetting to the substrate, comprising:

(i) a basic polymeric compound which is at least partially neutralized with acid to produce a cationic polymeric compound;

(ii) an acidic polymeric compound which is at least partially neutralized with base to produce an anionic polymeric compound; and (iii) non-aqueous solvent which comprises in the range of about 50% to 99.8% by weight of the fluid composition, wherein the substrate is pretreated to form a printing plate precursor with a surfactant selected from the group consisting of alkyl tail surfactants, fluorosurfactants and siliconated surfactants.

19. The printing plate of claim 18, in which the printing plate is dried subsequent to application of the fluid composition.

20. The printing plate of claim 18, wherein the non-aqueous solvent comprises in the range of about 84% to 99.8% by weight of the fluid composition.

21. A method of preparing a printing plate comprising:

(a) providing a substrate; and (b) applying by ink jetting to the substrate a fluid composition comprising:

(i) a basic polymeric compound which is at least partially neutralized with acid to produce a cationic polymeric compound;

(ii) an acidic polymeric compound which is at least partially neutralized with base to produce an anionic polymeric compound; and (iii) non-aqueous solvent which comprises in the range of about 50% to 99.8% by weight of the fluid composition, wherein the substrate is pretreated to form a printing plate precursor with a surfactant selected from the group consisting of alkyl tail surfactants, fluorosurfactants and siliconated surfactants.

22. The method of claim 21, in which the printing plate is dried subsequent to application of the fluid composition.

23. The method of claim 21, wherein the non-aqueous solvent comprises in the range of about 84% to 99.8% by weight of the fluid composition.

24. A method of forming an image onto a substrate comprising:

(a) providing a substrate; and (b) applying by ink jetting to the substrate a fluid composition comprising:

(i) a basic polymeric compound which is at least partially neutralized with acid to produce a cationic polymeric compound;

(ii) an acidic polymeric compound which is at least partially neutralized with base to produce an anionic polymeric compound; and (iii) non-aqueous solvent which comprises in the range of about 50% to 99.8% by weight of the fluid composition;

in which the fluid composition forms the image; and (c) drying the fluid composition on the substrate, wherein the substrate is pretreated to form a printing plate precursor with a surfactant selected from the group consisting of alkyl tail surfactants, fluorosurfactants and siliconated surfactants.

25. The method of claim 24, wherein the non-aqueous solvent comprises in the range of about 84% to 99.8% by weight of the fluid composition.

26. An imaged substrate comprising:

(a) a substrate; and (b) a fluid composition applied to the substrate, comprising:
  (i) a basic polymeric compound which is at least partially neutralized with acid to produce a cationic polymeric compound;
  (ii) an acidic polymeric compound which is at least partially neutralized with base to produce an anionic polymeric compound; and
  (iii) non-aqueous solvent which comprises in the range of about 50% to 99.8% by weight of the fluid composition, wherein the substrate is pretreated to form a printing plate precursor with a surfactant selected from the group consisting of alkyl tail surfactants, fluorosurfactants and siliconated surfactants.

27. The imaged substrate of claim 26, in which the fluid composition is applied to the substrate by ink jetting.

28. The imaged substrate of claim 26, wherein the non-aqueous solvent comprises in the range of about 84% to 99.8% by weight of the fluid composition.

29. A method of copying an image onto a medium comprising:

(a) providing a substrate; and (b) applying by ink jetting to the substrate a fluid composition comprising:
  (i) a basic polymeric compound which is at least partially neutralized with acid to produce a cationic polymeric compound;
  (ii) an acidic polymeric compound which is at least partially neutralized with base to produce an anionic polymeric compound; and
  (iii) non-aqueous solvent which comprises in the range of about 50% to 99.8% by weight of the fluid composition;

in which the fluid composition forms the image;

(c) drying the fluid composition on the substrate;

(d) contacting the dried formed image with an ink thereby coating the formed image with the ink; and (e) contacting the formed image coated with the ink with a medium capable of receiving the ink in the form of the image, wherein the substrate is pretreated to form a printing plate precursor with a surfactant selected from the group consisting of alkyl tail surfactants, fluorosurfactants and siliconated surfactants.

30. The method of claim 29, wherein the non-aqueous solvent comprises in the range of about 84% to 99.8% by weight of the fluid composition.

* * * * *